US012602562B1

(12) United States Patent
Tham et al.

(10) Patent No.: US 12,602,562 B1
(45) Date of Patent: Apr. 14, 2026

(54) MEDIA PROCESSING DEVICES WITH 2-DIMENSIONAL ARTICULABLE RF ANTENNA

(71) Applicant: Zebra Technologies Corporation, Lincolnshire, IL (US)

(72) Inventors: Wai Kean Tham, Gopeng (MY); Yuming Zhang, Singapore (SG)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 19/177,113

(22) Filed: Apr. 11, 2025

(51) Int. Cl.
    *G06K 19/02* (2006.01)
    *G06K 19/077* (2006.01)
(52) U.S. Cl.
    CPC ..... *G06K 19/025* (2013.01); *G06K 19/07722* (2013.01); *G06K 19/07779* (2013.01)
(58) Field of Classification Search
    CPC ........... G06K 19/025; G06K 19/07722; G06K 19/07779
    USPC ........................................................ 235/492
    See application file for complete search history.

(56) References Cited

U.S. PATENT DOCUMENTS

| | | | | |
|---|---|---|---|---|
| 8,456,307 | B2 * | 6/2013 | Suguro ............ | G06K 19/07754 |
| | | | | 438/118 |
| 9,495,632 | B2 * | 11/2016 | Green .............. | G06K 19/07758 |
| 10,475,357 | B2 * | 11/2019 | Kimes ................... | G09F 3/0288 |
| 10,546,224 | B2 * | 1/2020 | Forster ............. | G06K 19/07718 |
| 2001/0045455 | A1 * | 11/2001 | Kreuter .................... | B41J 3/283 |
| | | | | 235/381 |
| 2003/0136503 | A1 * | 7/2003 | Green .............. | G06K 19/07779 |
| | | | | 156/264 |
| 2014/0353375 | A1 * | 12/2014 | Turocy ............. | G06K 19/07779 |
| | | | | 235/379 |
| 2024/0013024 | A1 * | 1/2024 | Maeda .................. | G09F 3/0335 |

* cited by examiner

*Primary Examiner* — Michael G Lee
*Assistant Examiner* — David Tardif

(57) ABSTRACT

Media processing devices with two-dimensional articulatable RF antennas are disclosed herein. An example media processing device with a two-dimensional articulatable RF antenna includes a media process path having a feed direction; an RF encoder disposed at a point along the media process path, comprising a programming region; an RF antenna configured to program RF tags; and a driver configured to articulate the RF antenna in a first direction perpendicular to the feed direction and within the programming region, and articulate the RF antenna in a second direction, parallel with the feed direction and within the programming region.

16 Claims, 10 Drawing Sheets

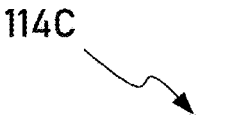
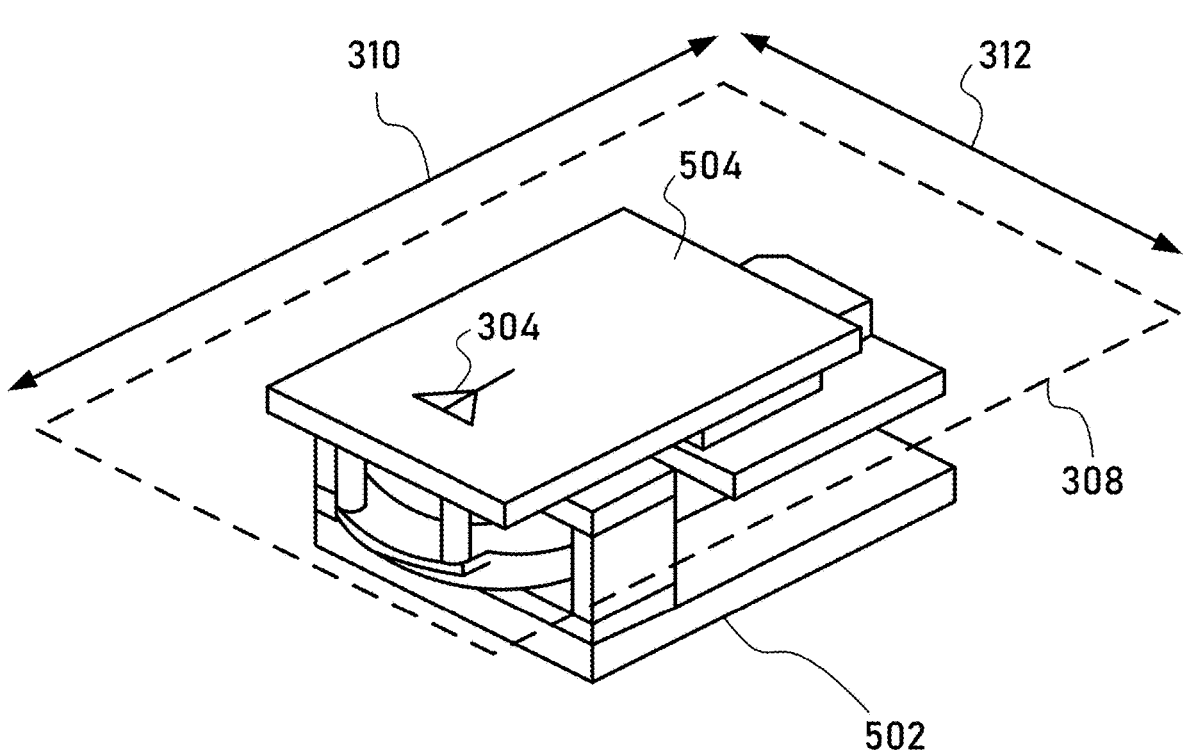
FIG. 5

600

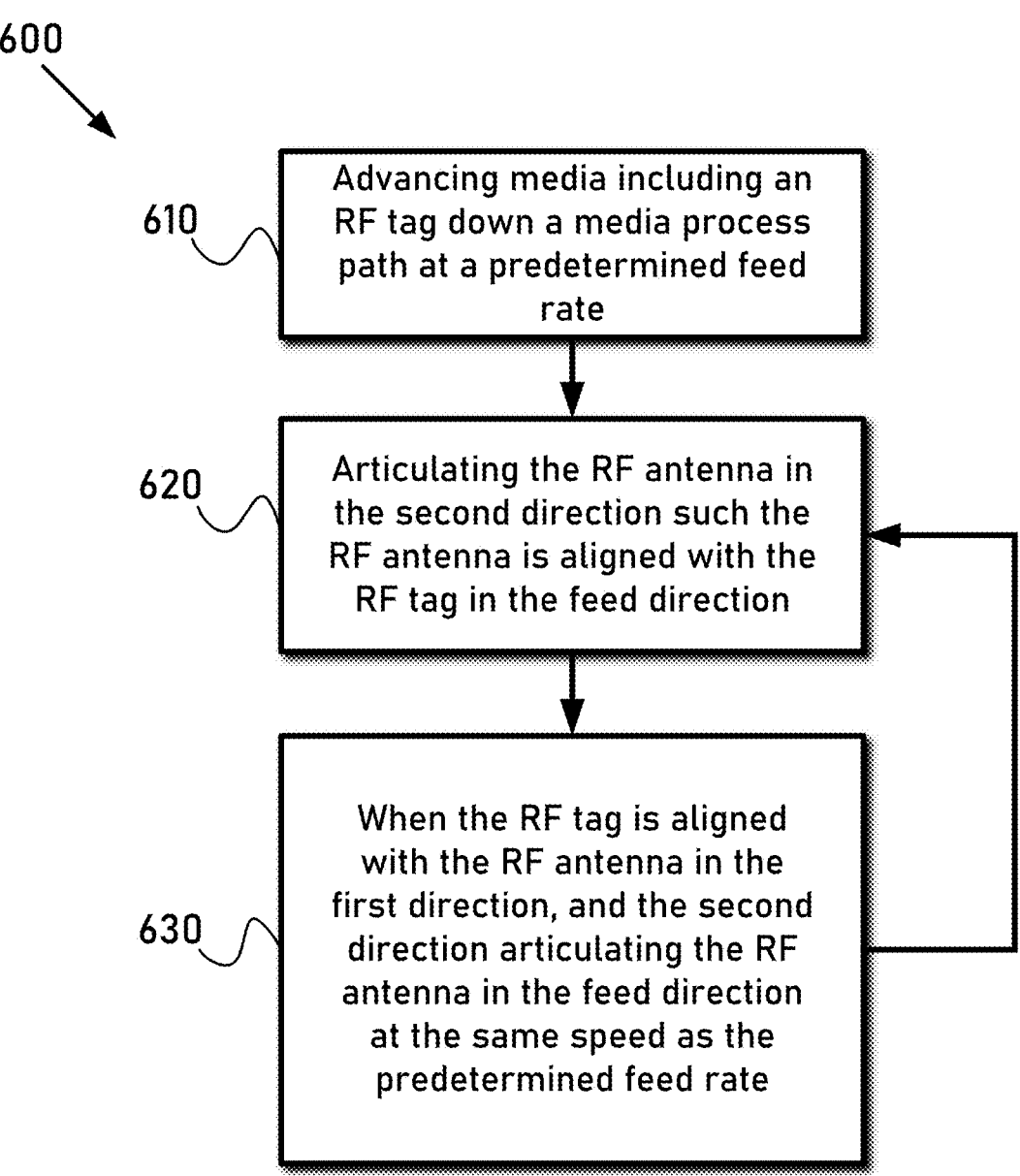

610 Advancing media including an RF tag down a media process path at a predetermined feed rate 620 Articulating the RF antenna in the second direction such the RF antenna is aligned with the RF tag in the feed direction 630 When the RF tag is aligned with the RF antenna in the first direction, and the second direction articulating the RF antenna in the feed direction at the same speed as the predetermined feed rate

910 — Providing a Base Unit including a printhead

920 — Installing an X-Y positioning system to the base unit

930 — Installing an RF antenna to the X-Y positioning system

MEDIA PROCESSING DEVICES WITH 2-DIMENSIONAL ARTICULABLE RF ANTENNA

BACKGROUND

Thermal printers employ heating elements to print pixels on printable media, and certain printable media includes programmable RF or NFC tags, which are programmable by an RF antenna housed in the thermal printer.

SUMMARY

In an example embodiment, the present disclosure provides a media processing device, configured to process a media web of media elements, each media element comprising an RF tag, the media processing device comprising: a media process path having a feed direction; an RF encoder disposed at a point along the media process path, comprising a programming region; an RF antenna configured to program RF tags; and a driver configured to articulate the RF antenna in a first direction perpendicular to the feed direction and within the programming region, and articulate the RF antenna in a second direction, parallel with the feed direction and within the programming region. The media processing device is configured to drive the media web along the media process path at predetermined feed rate. During a printing process, the media processing device is configured to control the driver in the first direction to align the RF antenna with an RF tag of an individual media element of the media web entering the programming region on the media process path, and further configured to control the driver in the second direction such that the RF antenna remains aligned with the RF tag as the media web is driven along the media process path through the programming region.

In a variation of this embodiment, the media processing device further includes a printhead, the printhead configured to impart indicia onto the media elements.

In a variation of this embodiment, during the printing process, the media processing device is configured to impart each media element of the media web with indicia, align each RF tag of the media web with the RF antenna for at least a predetermined amount of time, and advance the media web at the predetermined feed rate.

In a variation of this embodiment, the printhead is a thermal printhead.

In a variation of this embodiment, the RF encoder is located upstream of the printhead along the media process path, such that the RF tag of a given media element is programmed prior to the given media element being imparted with indicia during a printing process.

In a variation of this embodiment, the printhead is located upstream of the RF encoder along the media process path, such that the RF tag of a given media element is programmed after the given media element is imparted with indicia during a printing process.

In a variation of this embodiment, the printhead is located within the programming region, such that the RF tag of a given media element is programmed while being imparted with indicia during a printing process.

In a variation of this embodiment, the RF encoder includes one or more of a two-dimensional driver, a dual axis motor, a dual axis stepper motor, a dual axis gantry system, a single plane positioning stage, and combinations thereof.

In a variation of this embodiment, the predetermined feed rate is selected from a group consisting of a constant feed rate, a variable feed rate, and a sequence of feed rates.

In an example embodiment, the present disclosure provides a media processing device, comprising a media driver configured to drive a media web along a media process path in a feed direction, a printhead disposed at a first point along the media process path and configured to impart indicia onto media elements of the media web; an RF encoder disposed at a second point along the media process path and comprising: a programming region aligned with a portion of the media process path; an RF antenna configured to program an RF tag of each media element of the media web; and an antenna driver configured to articulate the RF antenna in a first direction perpendicular to the feed direction and within the programming region, and articulate the RF antenna in a second direction, parallel with the feed direction and within the programming region; and a logic circuit. The logic circuit is configured to control the media driver to drive the media web along the media process path, control the printhead to impart the indicia on predetermined media elements, control the antenna driver to align the RF antenna with the RF tag of each media element in the first direction; and control the antenna driver to move the RF antenna in the second direction synchronously with the media driver such that the RF antenna remains aligned with the RF tag of each media element in the first direction and in the second direction when each media element is in the programming region.

In a variation of this embodiment, during a printing process, the media processing device is configured to impart indicia to a first media element via the printhead while concurrently programming the RF tag of the first media element via the RF antenna.

In a variation of this embodiment, during a printing process, the media processing device is configured to impart indicia to a first media element via the printhead while concurrently programming the RF tag of the first media element or the RF tag of a second media element within the programming region via the RF antenna.

In an example embodiment, the present disclosure provides a method of forming a media processing device, comprising: providing a base unit including a printhead, the base unit defining a media process path having a feed direction, installing an x-y positioning system at a point along the media process path, defining a two-dimensional programming region which is parallel with the media process path at the point along the media process path, and installing an RF antenna to the x-y positioning system, such that the RF antenna is articulatable by the x-y positioning system throughout the two-dimensional programming region.

In a variation of this embodiment, the point along the media process path is upstream of the printhead.

In a variation of this embodiment, the printhead is upstream of the point along the media process path.

In a variation of this embodiment, the printhead is located at the point along the media process path.

BRIEF DESCRIPTION OF THE DRAWINGS

The accompanying figures, where like reference numerals refer to identical or similar elements throughout the separate views, together with the detailed description below, are incorporated in and form part of the specification, and serve to further illustrate embodiments of concepts that include the claimed invention and explain various principles and advantages of those embodiments.

FIG. 5 illustrates an example embodiment of a 2-D articulatable RF antenna including a dual axis positioning stage, according to embodiments of the present disclosure.

FIG. 6 illustrates a flowchart of a method for conducting a streamed printing and programming process as may be executed by a media processing device of FIG. 1, according to embodiments of the present disclosure.

Figure 1:
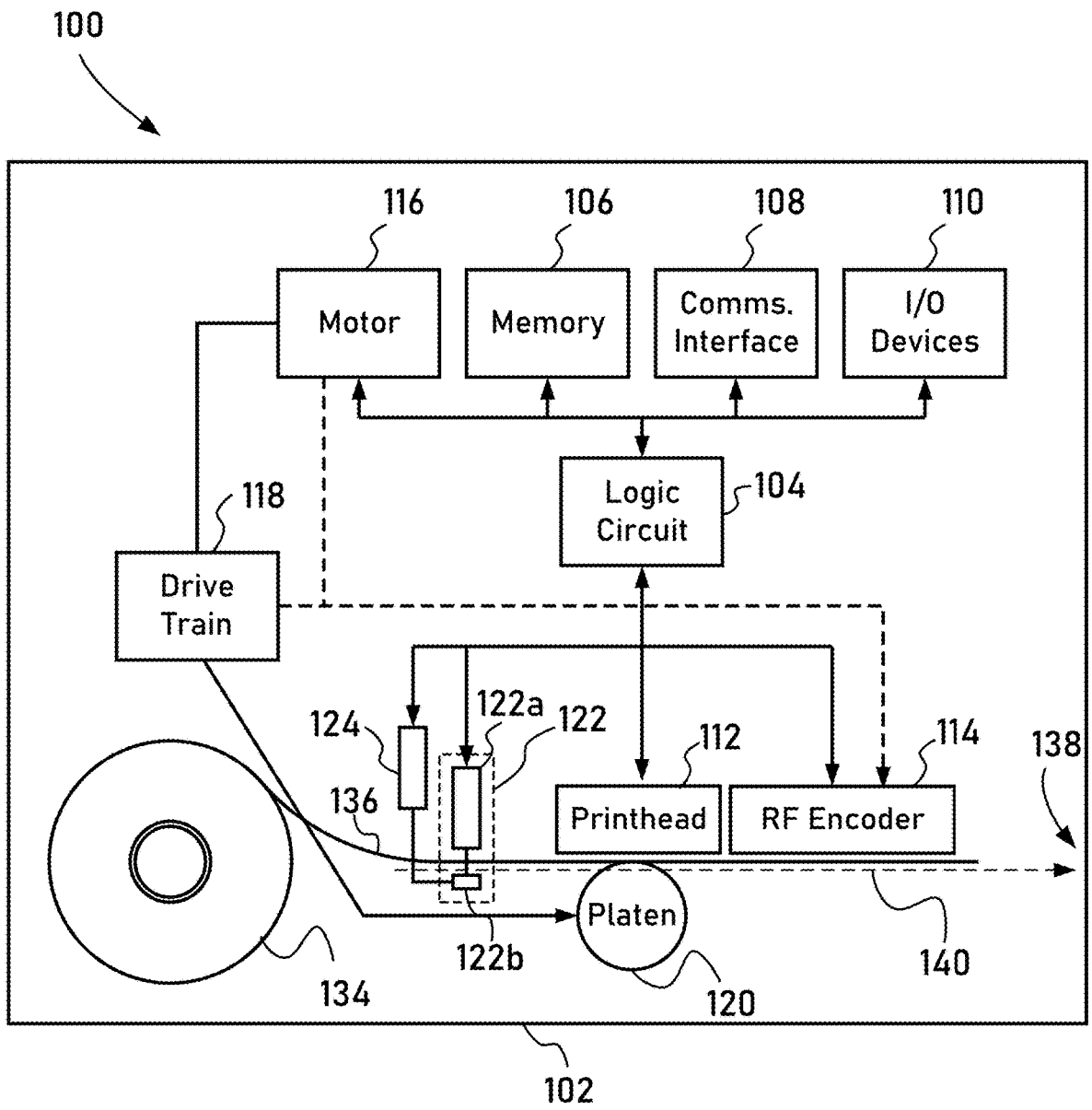
FIG. 1 illustrates a media processing device 100, according to embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Various examples of printable media elements may include radiofrequency (RF) tags, such as radiofrequency identification (RFID) tags or near field communication (NFC) tags (e.g., generally or collectively RF tags) coupled to each media element, which are programmable to contain data or other information to be decoded or read by an RF encoder or RF reader. Various media processing devices exist which are operable to impart printed indicia to a media element as well as program an RF tag of the media element. The process of programming an RF tag often requires a particular amount of time for which the RF antenna which is programming the RF tag must be within a particular programming range of the RF tag. In various examples, the amount of time required to program the antenna may be as much as 10 seconds, and the programmable range between the RF antenna and the RF tag may be as little as 5 centimeters (cm). As such, many existing media processing devices halt a printing process in order to provide adequate time within the programming range for the RF tag to be programmed. For printing processes which print and program webs of media including many connected media elements, stopping a print process for the RF tag of each media element to be programmed results in low throughput, compared to a printing process which does not program RF tags.

The technology of the present disclosure provides methods for streamlining a printing and programming process in which media elements are to be imparted with printed indicia, and RF tags of the media elements are to be programmed. By coupling the RF antenna which programs the RF tags to a two-dimensional driver, the RF antenna is articulatable along a portion of a media process path in step with the printing process, such that the printing process does not halt in order to provide time for the RF tags to be programmed. The RF antenna is aligned with an RF tag of a media element, and the RF antenna is moved along the media process path at the same speed as a feed rate of the media process path, such that RF antenna remains within the programming range of the RF tag for at least the amount of time required to program the RF tag via the RF antenna, without halting the printing process, and in some examples, without slowing the printing process.

FIG. 1 illustrates a block diagram of an example media processing device 100, such as a printer, in accordance with embodiments of the present disclosure. The media processing device 100 can include a housing 102. The housing 102 contains or supports one or more components of the media processing device 100 including, for example, a logic circuit 104, memory 106, a communication interface 108 (e.g., for wired and wireless communication), input/output (I/O) devices 110 (e.g., a display, switches, buttons, speakers, microphone, etc.), a printhead 112, a radio frequency (RF) encoder/reader 114, a motor 116, a drive train 118, a platen roller 120, a sensor 122, e.g., formed by an emitter 122a and a receiver 122b, and a detector 124. The printhead 112 and the platen roller 120 can form a nip. In some embodiments, e.g., for thermal transfer printing, the media processing device 100 can include a ribbon supply spindle and a ribbon take up spindle for supporting an ink ribbon (not shown). For direct thermal embodiments, the media processing device 100 can be devoid of the ribbon supply spindle, the ribbon take-up spindle, and the ink ribbon. The housing 102 can also be configured to contain a media supply 134. As an example, the housing 102 can include a media chamber to store the media supply 134 as it is consumed by the media processing device 100. The logic circuit 104 can include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. The memory 106 is a non-transitory computer-readable medium that can include, for example, volatile (e.g., RAM, DRAM, SRAM, etc.) and/or non-volatile memory (e.g., ROM, PROM, EPROM, EEPROM, Flash memory device, optical memory device, magnetic memory device).

The logic circuit 104 of the media processing device 100 can be operatively coupled to the memory 106, the communications interface 108, the I/O devices 110, the printhead 112, the radiofrequency encoder/reader 114, the motor 116, the sensor 122, and/or the detector 124. The platen roller 120 can be driven by the motor 116 via a drive train 118 to rotate the platen roller 120 about an axis of rotation in a first direction (e.g., clockwise in the orientation shown in FIG. 1) to pull the media 136 through the media process path 140 and output the media from the media processing device via a media exit 138 formed in the housing 102 and can be driven by the motor 116 via the drive train 118 to rotate the platen roller 120 about the axis of rotation in a second direction (e.g., counterclockwise in the orientation shown in FIG. 4) to retract the media 136 (in an opposite direction than the arrow 140). In one example, the logic circuit 104 can be configured to execute code stored in the memory 106 to perform operations and processes of the media processing device 100, e.g., by communicating with and/or controlling one or more of the components of the media processing device 100. The logic circuit 104 can execute the code stored memory 106 to implement a printing operation or process that controls the motor 116 to rotate the platen roller 120 to feed the media 136 past the printhead 112, controls the printhead 112 to print on the media 136 (either directly or by transferring an ink from a ribbon to the media), and/or controls the RF encoder/reader 114 to encode and/or read radiofrequency circuits (e.g., RFID or NFC tags or inlays) included in or on the media 136. For thermal transfer printing, the printable surface of the media 136 is configured to receive a pigment (e.g., resin, wax-resin, etc.) that is transferred from the ink ribbon installed on the ribbon supply and take-up spindles and, respectively, via an operation of the printhead 112. For direct thermal printing, the printhead 112 of the media processing device 100 can selectively heat the printable surface of the media 136 triggering a chemical or physical change in a thermally sensitive dye covering at least a portion of the printable surface of the media 136. After printing on the media 136, the media can be further advanced and output from media processing device 100 by the operation of the platen roller 120. The RF encoder/reader 114 can be positioned downstream of the printhead 112 (e.g., to the right of the printhead 112 in the orientation shown in FIG. 1) such that media elements pass the printhead 112 before passing the RF encoder/reader 114 or can be positioned upstream of the printhead (e.g., to the left of the printhead 112 in the orientation shown in FIG. 1) such that media elements pass RF encoder/reader 114 the before passing the printhead 112.

To ensure the printhead 112 prints at specified or desired locations on the media 136 as the media 136 passes the printhead 112 and/or to ensure alignment of the RF encoder/reader 114 with RF tags of the media elements, the logic circuit 104 can be configured to calibrate the media 136 relative to the printhead 112 and/or to register the media 136 relative to the printhead 112, e.g., by identifying a designated printing area on the media 136 and the logic circuit 104 can control the printhead 112 to print on the designated printing area of the media. To facilitate to the identification of the designated printing areas, the media 136 may include demarcation features that can be used to locate the designated printing areas. In some instances, the demarcation features can include black marks or other indicia to indicate the designated printing areas, can include gaps between discrete media units to indicate the designated printing areas, and/or can include notches in the media. As an example, the media 136 can include a continuous web of discrete labels or wristbands, where the web or the labels/wristbands can include indicia (e.g., black marks) to demarcate adjacent labels/wristbands along a length the web. As another example, the discrete labels can be spaced apart from each other on the web such that a gap exists between adjacent labels along a length of the web of (transparent or translucent) liner where the gaps can demarcate the adjacent labels along the length of the web. As an example, the media 136 can include a continuous web of labels or wristbands, where the web or the labels/wristbands can include notches to demarcate adjacent labels/wristbands along a length the web. These demarcation features can be used to identify leading edges and/or trailing edges of the labels and/or can be used to calibrate and/or register the media relative to the printhead to ensure that the logic circuit 104 controls the printhead 112 to print on the media at a specified and/or desired location (e.g., in the printing area based on a print command and/or print data).

The sensor 122 can be configured to respond to the demarcation feature between media units and to output a sensor output to the detector 124 representative of the response to the demarcation feature. In the present example embodiment, the sensor 122 includes the emitter 122a and the receiver 122b configured in a transmissive sensor configuration. However, in other example embodiments, the emitter 122a and the receiver 122b can be configured in a reflective sensor configuration. The sensor 122 can be an optical sensor, where the emitter 122a can be, for example, a photodiode that emits electromagnetic energy in the light spectrum (e.g., a light signal) and receiver 122b can be a photodetector that detects the presence or absence of the emitted electromagnetic energy (e.g., the light signal) impinging on the receiver 122b and/or can detect variation in the intensity or power of the electromagnetic energy (e.g., the light signal) impinging on the receiver 122b. The sensor 122 can continuously output the sensor output. The sensor output can have a first range of output values between demarcation features and can have a second range of output values when demarcation features are detected. In some instances, there can be significant variation in the output values of the sensor output between detection of demarcation features and/or between different media supplies (even between different media supplies of the same type or model of media), e.g., due electrical and/or optical noise inserted into the sensor, due to variations and tolerances in the manufacturing processes of the media. Due to such variation, conventional approaches which typically use thresholding to distinguish between the first range of values and the second range of values of the senor output, can be impractical, inaccurate, or otherwise require complicated firmware algorithms, which can negatively impact the ability of the media processing device to effectively and efficiently calibrate and/or register the media 136 relative to the printhead 112.

In accordance with embodiments of the present disclosure, the detector 124 can continuously receive the sensor output from the sensor 122 (e.g., an electrical signal from the receiver 122b) that is representative of the presence or absence of the light signal impinging on the receiver 122b and/or that is representative of the intensity or power of the light signal impinging on the receiver 122b. The detector 124 can be implement in hardware as circuitry that includes signal processing circuitry. In response to receiving the sensor output from the sensor 122, the detector 124 can process the sensor output and generate a detector output that includes pulses corresponding to the detection of the demarcation features as the media is being advanced past the sensor 122 (e.g., via an operation of the platen roller 120). The detector output generated by the detector 124 can be output by the detector 124, to the logic circuit 104 and the pulses in the detector output can identify the demarcation features, which can be used by the logic circuit to locate leading edges of media units (e.g., a label or wristband) or printable area of the media units and/or trailing edges of the media units or printable areas of the media units and/or can be used to calibrate and/or register the media 136 relative to the printhead 112 without having to specify a threshold and/or without relying on software algorithms for the detection of demarcation features. In one example, at least one edge of a pulse included in the detector output can align with a leading edge of a media unit (e.g., a label or wristband) or pintable area of a media unit and/or can align with a leading edge of a demarcation feature. Alternatively, or in addition, in one example, at least one edge of a pulse included in the detector output can align with a trailing edge of a media unit (e.g., a label or wristband) or printable area of the media unit and/or can align with a trailing edge of a demarcation feature.

While an embodiment of the media processing device has been illustrated as a thermal printer, in accordance with embodiments of the present disclosure, the media processing device can be, for example, an inkjet printer or a laser printer.

Figure 2:
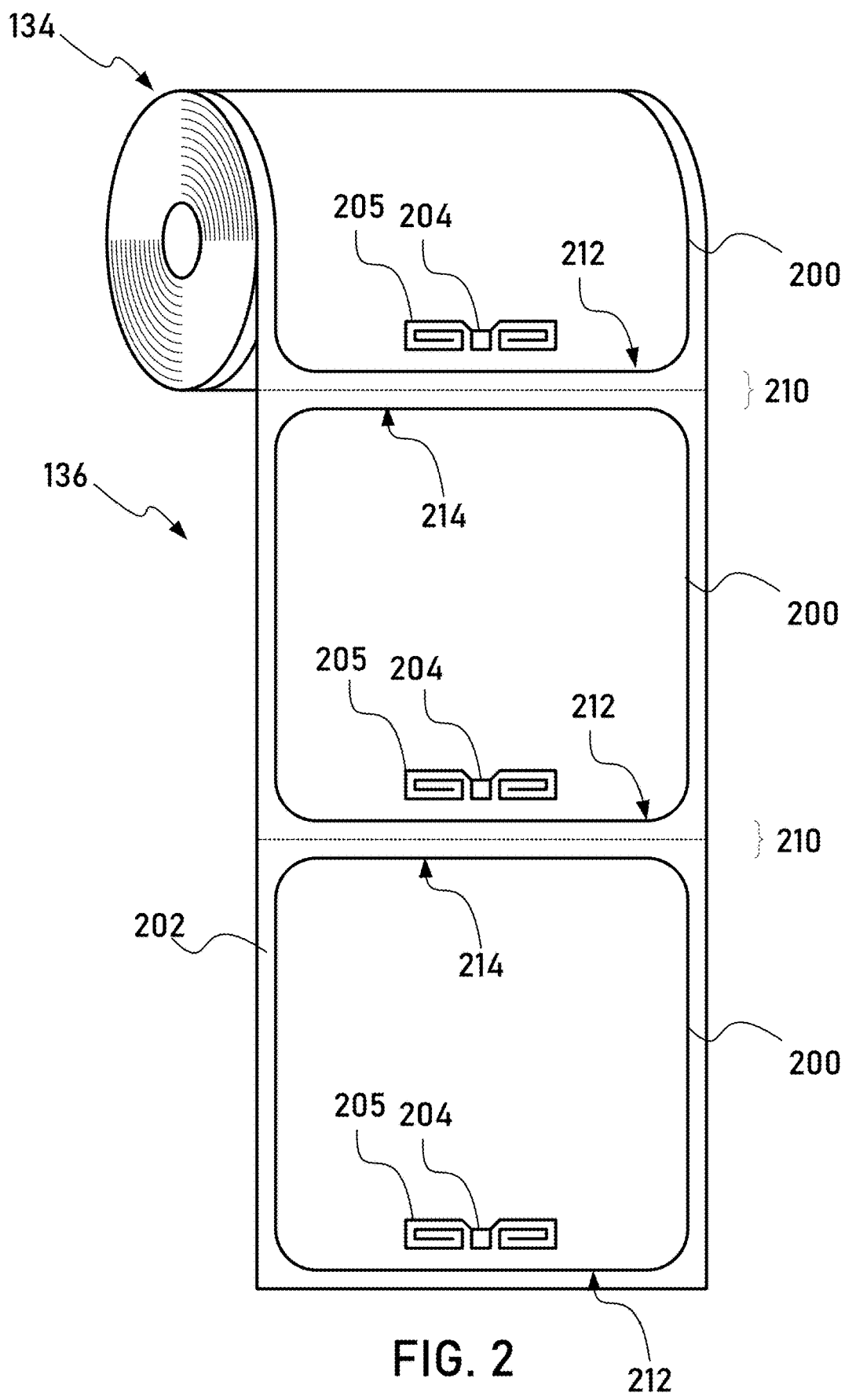
FIG. 2 illustrates a roll of media including programmable RF tags, according to embodiments of the present disclosure.

FIG. 2 illustrates an example of a media supply 134 configured as a roll of media 136, according to embodiments of the present disclosure. In the illustrated embodiment of FIG. 2, the media 136 is configured as a web, and includes media elements 200 (e.g., printable media elements) which overlay a liner 202. Each media element 200 includes an RF tag 204 (e.g., RFID tag, NFC tag, RF inlay). Each media element 200 may be spaced along the liner 202 such that a gap 210 spaces each media element 200 from the next.

In various examples, the media elements 200 may be thermal printable media elements, including direct thermal and thermal transfer stock. Furthermore, the media elements 200 may be ink-printable media configured to be printed by an inkjet or laser printer.

According to various examples, each RF tag 204 may be disposed at a predetermined location or otherwise known location on each media element 200 (e.g., within manufacturing tolerances). For example, each RF tag 204 may be disposed centrally on each media element or disposed towards one side of the media element 200 or another, at a predetermined distance from a particular edge, for example. Generally, each RF tag 204 may be disposed at a same location relative to each media element 200, although variable and non-consistent placement of RF tags 204 is contemplated. Each RF tag 204 may contain, for example, one or more antennas 205, an integrated circuit, a microchip, and a memory. The RF tags 204 may be selectively programmable by an RF antenna, or by an encoding device (e.g., RF encoder 114).

Figure 3:
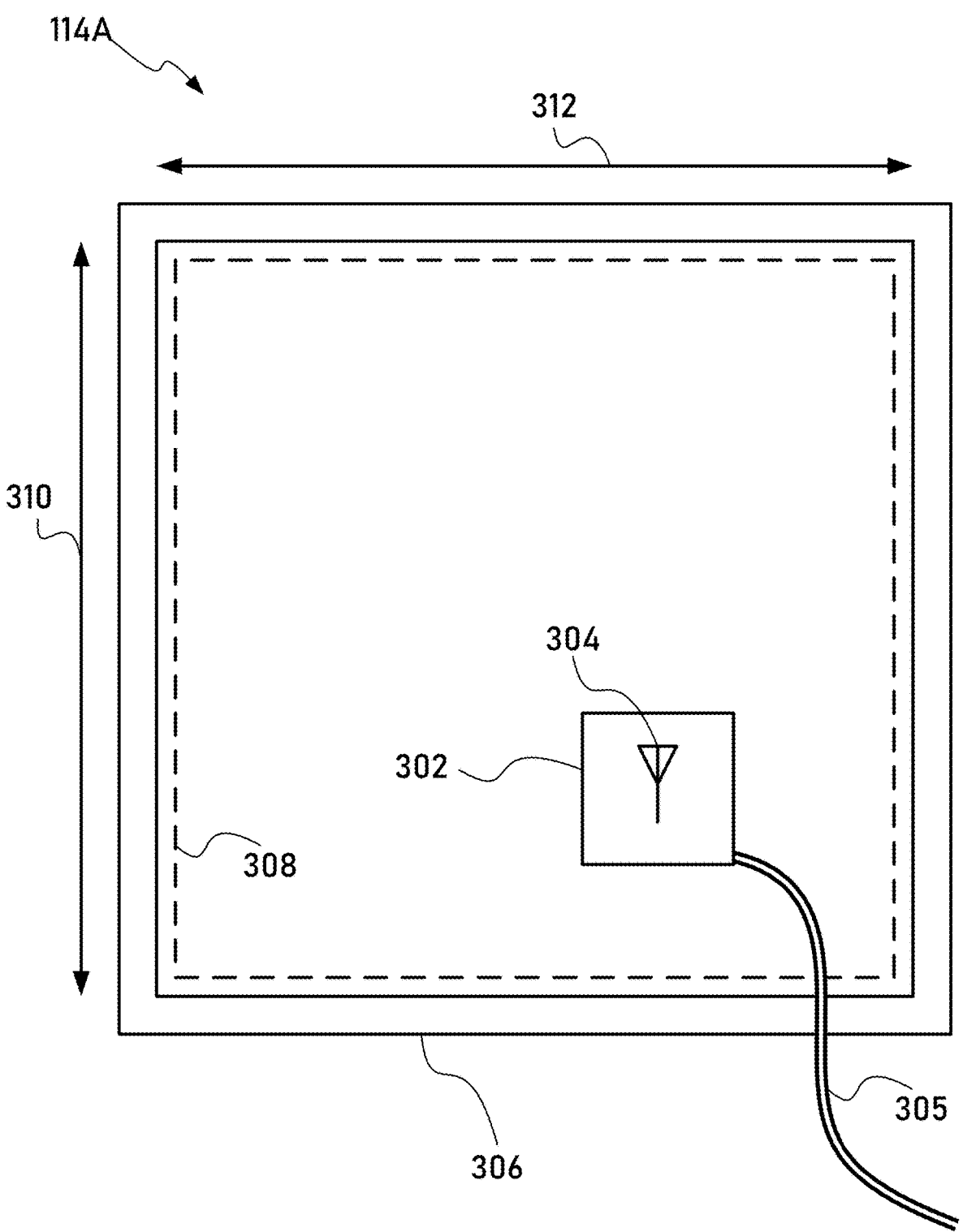
FIG. 3 illustrates an example embodiment of a 2-D articulatable RF antenna including a dual axis driver, according to embodiments of the present disclosure.
Figure 4:
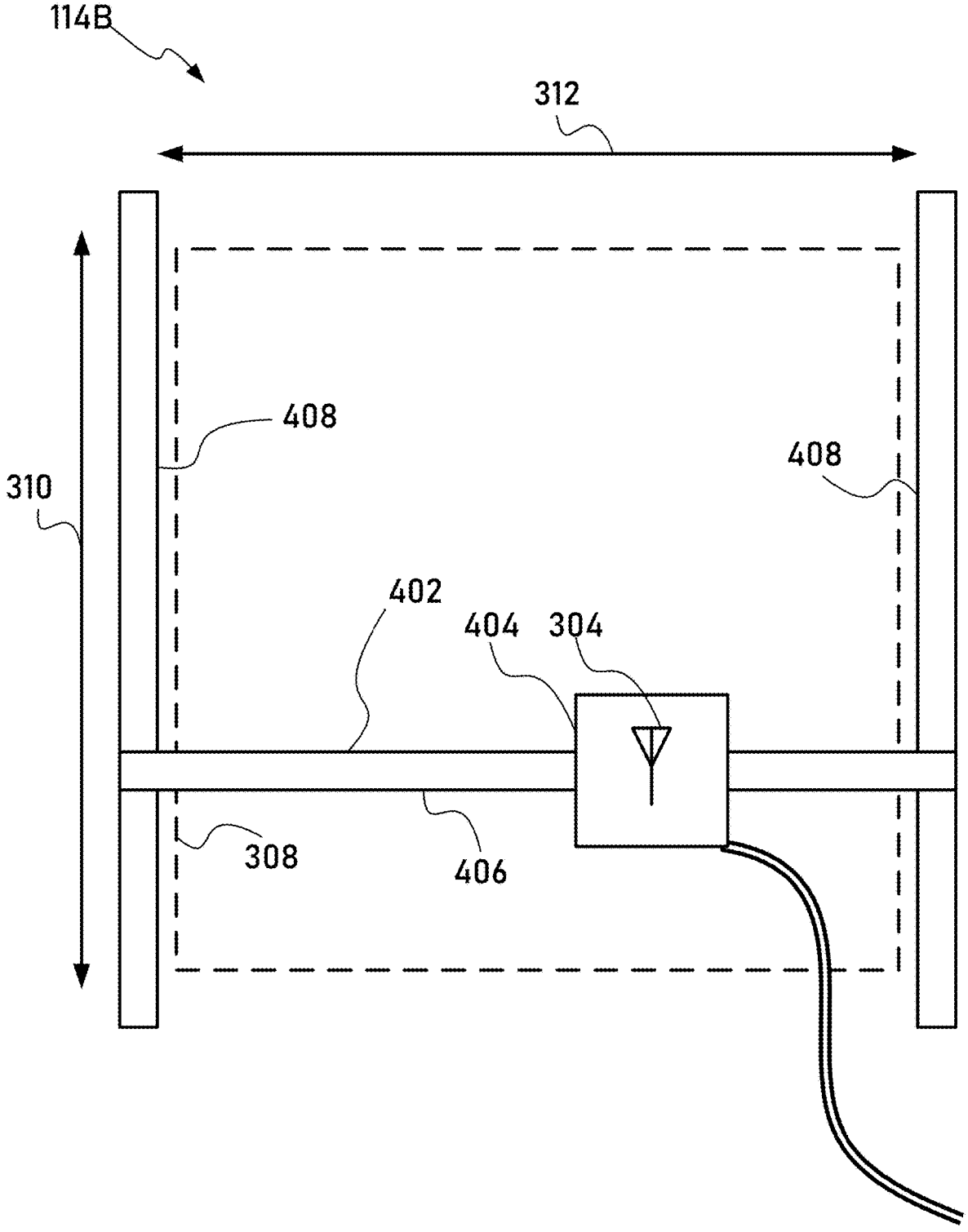
FIG. 4 illustrates an example embodiment of a 2-D articulatable RF antenna including a gantry, according to embodiments of the present disclosure.

FIGS. 3-5 illustrate various embodiments of articulatable RF encoders 114A-C (generally or collectively RF encoders 114, which can read data from and/or write data to RF tags), each of which may be employed as the RF encoder 114 in a media processing device 100. Generally, an articulatable RF encoder 114 includes an RF antenna 304 which is articulatable in at least two dimensions by an antenna driver within a defined programming region 308.

FIG. 3 illustrates an example of an articulatable RF encoder 114A according to embodiments of the present disclosure. In various examples, the articulatable RF encoder 114A may serve as the RF encoder/reader 114 in the media processing device 100. The articulatable RF encoder 114A includes a 2D driver 302 (e.g., dual axis motor, dual axis stepper motor) which is coupled to an RF antenna 304. The 2D driver 302 is articulatable throughout a programming region 308 which is defined on a platform 306. In various examples, the 2D driver 302 may employ roller bearings, air bearings, magnetic forcers, or other components to move across the platform 306 and throughout the programming region 308. In various examples, the 2D driver 302 includes connective hardware 305 which may be configured to supply electrical power, compressed air, and control signals. In various examples the platform 306 includes a surface which facilitates the movement of the 2D driver 302 thereover. In some examples the surface of the platform 306 may be textured, coated or treated to interface with the 2D driver 302.

Generally, the articulatable RF encoder 114A is articulatable in a first direction 310 and a second, perpendicular direction 312. Both the first direction and the second direction are defined in the plane of the platform 306, and articulation in both the first direction and the second direction may occur simultaneously.

The articulatable RF encoder 114A is configured such that when the 2D driver 302 is articulated and moved about the programming region 308, so too is the RF antenna 304 moved about the programming region 308. In this manner the RF antenna 304 may be positioned anywhere within the programming region 308 as may be desired for programming an RF tag (e.g., RF tag 204) located within or proximate to the programming region.

Examples of a 2D driver 302 and platform 306 include the LMDS series of dual-axis planar linear stepper motors produced by H2 W Technologies of Santa Clarita, California.

FIG. 4 illustrates an example of an articulatable RF encoder 114B, according to embodiments of the present disclosure. In various example, the articulatable RF encoder 114B may serve as the RF encoder/reader 114 in the media processing device 100. The articulatable RF encoder 114B includes a gantry assembly 402, including rails 408, a crossbar 406 and a carriage 404. In various examples, the crossbar 406 may be articulated along the rails 408 in the first direction 310, and the carriage may be articulated along the crossbar 406 in the second direction 312. An RF antenna 304 is coupled to the carriage 404 and is articulable with the carriage 404. In various examples, the extent of motion of the carriage 404 in the second direction and the extent of motion of the crossbar 406 in the first direction define the programming region 308 throughout which the RF antenna 304 is articulatable. The gantry assembly 402 may further include various motors and drivers, or connections to motors or divers in the media processing device 100 to articulate the crossbar 406 along the rails 408 and the carriage 404 along the crossbar 406. In such examples, the motors and drivers serve as antenna articulators.

The articulatable RF encoder 114B is configured such that when the carriage 404 is articulated and moved about the programming region 308, so too is the RF antenna 304 moved about the programming region 308. In this manner the RF antenna 304 may be positioned anywhere within the programming region 308 as may be desired for programming an RF tag 204 located within or proximate to the programming region.

FIG. 5 illustrates an example articulatable RF encoder 114C, according to embodiments of the present disclosure. In various examples, the 2D articulable RF antenna 114C may serve as the RF encoder/reader 114 in the media processing device 100. The articulatable RF encoder 114C includes a dual axis positioning stage 502, and an RF antenna 304 coupled thereto. In various examples, the dual axis positioning stage 502 is a voice coil positioning stage. The dual axis positioning stage 502 is configured to articulate a platform 504 in the first direction 310 and the second direction 312, and the RF antenna 304 is coupled to the platform 504 such that the RF antenna is articulatable with the platform 504.

The articulatable RF encoder 114C is configured such that when the platform 504 is articulated and moved about the programming region 308, so too is the RF antenna 304 moved about the programming region 308. In this manner the RF antenna 304 may be positioned anywhere within the programming region 308 as may be desired for programming an RF tag (e.g., RF tag 204) located within or proximate to the programming region 308.

Examples of a dual axis positioning stage include the VCS and VMS series of Voice Coil Stages produced by H2 W Technologies of Santa Clarita, California.

FIG. 6 illustrates a flowchart of a method 600 for conducting a streamed printing and programming process as may be executed by a media processing device 100, according to embodiments of the present disclosure. FIGS. 7A-7D illustrates various views of some relevant portions of the media processing device 100 in various stages and steps of the method 600, according to embodiments of the present disclosure. The following discussion may address features of FIGS. 6-7D concurrently.

Figure 7A:
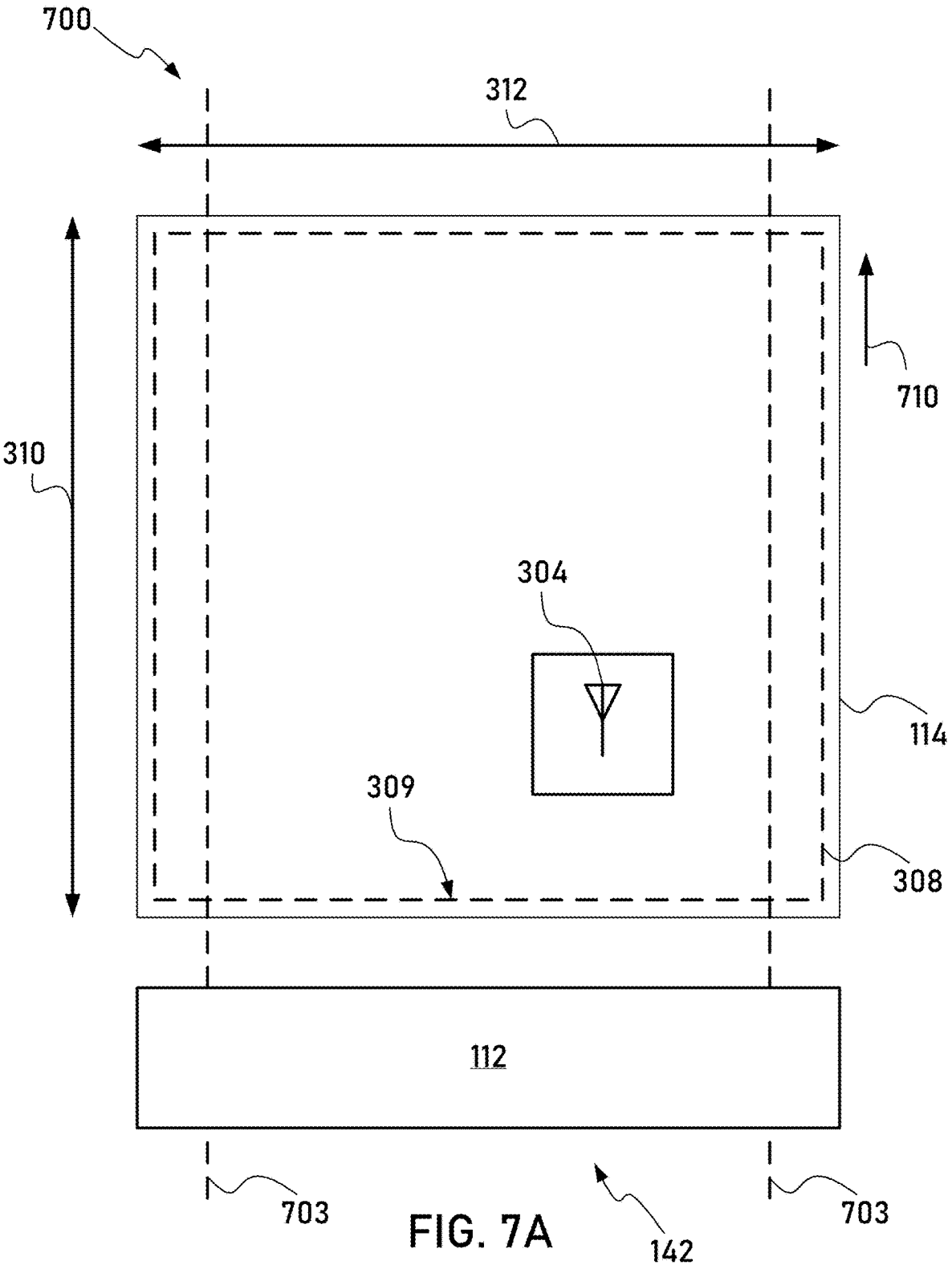
FIGS. 7A-7D illustrate a portion of the media processing device of FIG. 1 engaged in a streamable printing and programming process, according to embodiments of the present disclosure.
Figures 7B, 7C, 7D:
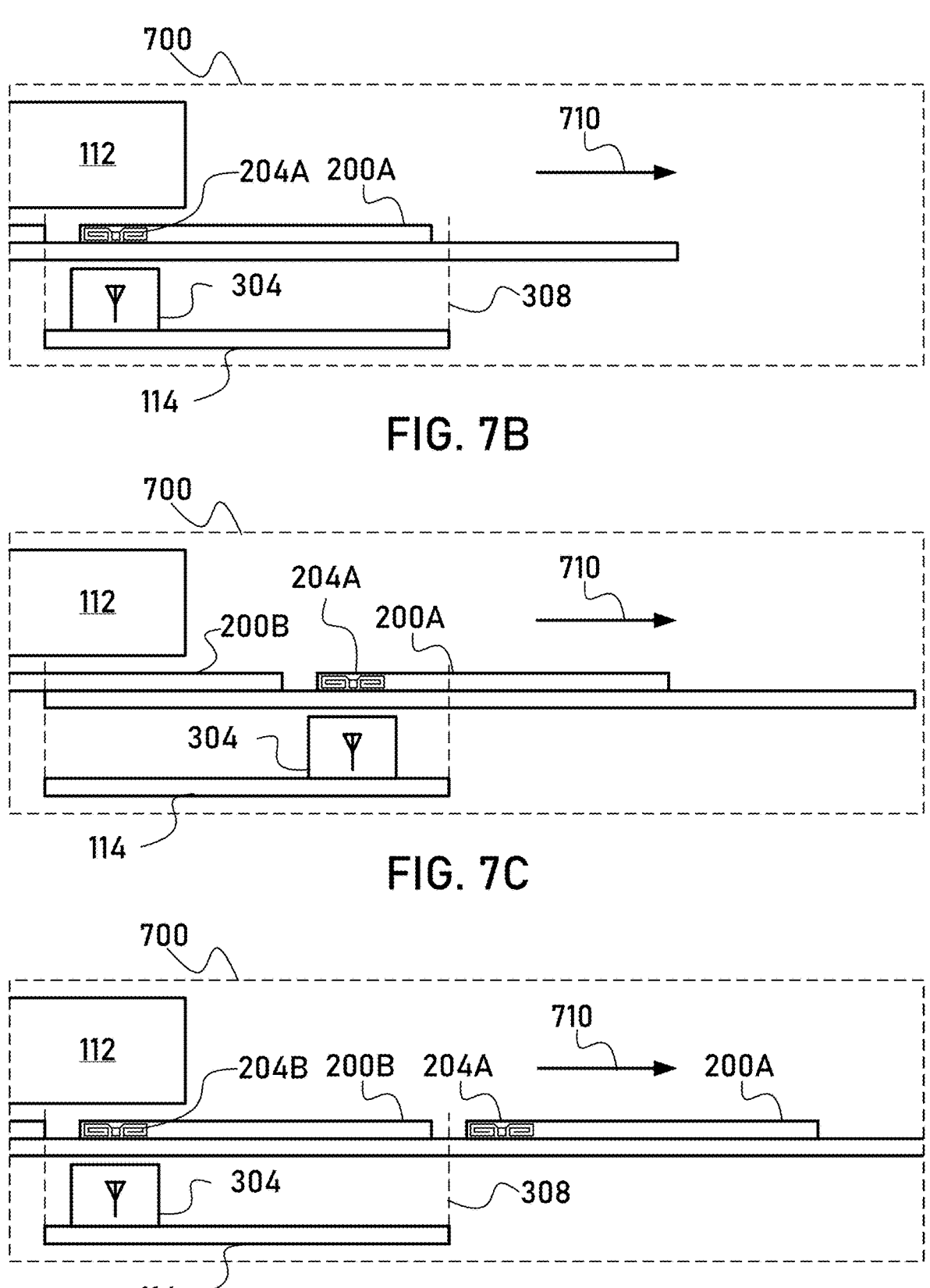

The method 600 is a method for conducting a printing and programming process on media 136 (e.g., including media elements 200 having RF tags 204) by a media processing device 100. The printing and programming process described in the method 600 may be a subset or portion of a larger media process, where the larger media process includes other conventional media processing techniques and sequences. While all the components of the media processing device 100 may be employed to perform the printing and programming process in one manner or another, FIGS. 7A-7B illustrate particular components which perform actions of the steps of the method 600. Generally, the method 600 is executable by a portion 700 of the media processing device 100 including the printhead 112 (e.g., including the platen roller 120, not shown) and the RF encoder 114. The RF encoder 114 may be an articulatable RF encoder 114A, an articulatable RF encoder 114B, or an articulatable RF encoder 114C. Generally, the RF encoder 114 includes an RF antenna 304 which is articulatable in at least the first direction 310 and the second direction 312 throughout the programming region 308 by an antenna driver (e.g., two-dimensional driver, gantry assembly, or positioning stage). During the printing and programming process, each media element 200 is to have indicia imparted (e.g., printed) thereupon by the printhead 112, and each RF tag 204 is to be programmed by the RF antenna 304 of the RF encoder 114. In various examples, the process is configured to be executed such that the media 136 may be advanced through the printing and programming process uninterrupted, e.g., without stopping the movement of media along the media process path. In various examples, the media 136 may be fed along the media process path at a predetermined feed rate, where the predetermined feed rate may be a constant feed rate, a predetermined sequence of different feed rates, or a variable feed rate. Generally, the feed rate at any given time in the process is known, such that motion of the antenna driver may be synchronized with the feed rate of the media 136. Said differently, the printing and programming process is a streamable process.

Generally, each RF tag 204 requires a predetermined programming time within a predetermined programming range of the RF antenna 304 to be programmed by the RF antenna 304, and each media element 200 is to be imparted with indicia while being advanced at the feed rate, which can be constant or variable. In various examples, the predetermined programming range may be within 10 centimeters (cm), within 5 cm or within 3 cm, and the predetermined programming time may be at least 0.5 seconds, at least 1 second, or at least 3 seconds. The above ranges are purely exemplary, and different RF tags 204 may have different programming ranges and times.

Block 610 of the method 600 describes advancing media 136 down a media process path at a feed rate, according to embodiments of the present disclosure.

The media 136 is advanced along the media process path 140 (e.g., between dashed lines 703) in the feed direction 710, at the feed rate. The media 136 is advanced by the platen roller 120 (See FIG. 1) or other rollers or media handling/moving components, which may be operatively coupled to the drive train 118 (See FIG. 1) to advance the media 136. In some examples, during the actions described in block 610, the media may be imparted with indicia via the printhead 112.

Block 620 of the method 600 describes aligning the RF antenna 304 with an RF tag 204 in the second direction, according to embodiments of the present disclosure. When a given media element 200A approaches the programming region 308, the RF encoder 114 articulates (e.g., is controlled to articulate) the RF antenna 304 in the second direction 312 such that the RF antenna 304 is aligned with the RF tag 204A of the given media element 200A in the feed direction. In the context of the method 600, when the RF antenna 304 is said to be aligned with the RF tag 204A of the given media element 200A in the feed direction, were the RF antenna 304 to remain in a fixed position, the media 136 would continue to be advanced such that at some point during the process, the RF tag 204A would be directly above (e.g., or below) the RF antenna 304 (e.g., in a direction perpendicular to the plane of the media process path).

In various examples, the RF encoder 114 receives control signals from the logic circuit 104 or other control device to articulate the RF antenna 304 in the second direction to align with the RF tag 204A. In various examples, the location of the RF tag 204A on the given media element 200A may be predetermined with respect to the printing process. In some examples, a sensor and/or sensing method may be employed to calculate a location of the RF tag 204A with respect to the given media element 200A, and the RF encoder 114 controlled to articulate the RF antenna 304 to a position corresponding to the calculated location of the RF tag 204A.

In various examples, the RF antenna 304 is articulated along the second direction 312 to align with the RF tag 204, and the RF antenna 304 may be further articulated in the first direction, such that the RF antenna 304 is abutting, or otherwise proximate to a leading edge 309 of the programming region 308. Generally, the leading edge 309 of the programming region 308 is the edge of the programming region 308 which is most upstream with respect to the feed direction.

In examples where the RF encoder 114 is the articulatable RF encoder 114A, the RF antenna is articulated in the second direction 312 by controlling the 2D driver 302 to move in the second direction 312.

In examples where the RF encoder 114 is the articulatable RF encoder 114B, the RF antenna 304 is articulated in the second direction 312 by articulating the carriage 404 along the crossbar 406. In an alternate configuration where the gantry assembly 402 is rotated 90 degrees, the RF antenna 304 may be articulated in the second direction 312 by articulating the crossbar 406 along the rails 408.

In examples where the RF encoder 114 is the articulatable RF encoder 114C, the RF antenna may be articulated in the second direction 312 by articulating the platform 504 in the second direction 312.

Block 630 of the method 600 describes articulating the RF antenna 304 in the feed direction at the same speed as the feed rate when the RF tag is aligned with the RF antenna in the first direction, and the second direction, according to embodiments of the present disclosure. Referring specifically to FIG. 7B, after the RF antenna 304 is aligned with the RF tag 204A in the second direction, the RF antenna 304 remains in position until the media 136 is advanced such that the RF tag 204A is directly above (e.g., or below) the RF antenna 304 (e.g., in a direction perpendicular to the plane of the media process path 140). Said differently, the RF antenna 304 remains in position until the media 136 is advanced such that the RF tag 204A is aligned with the RF antenna 304 in both the first direction 310 and the second direction 312. Once the RF tag 204A is aligned with the RF antenna 304, the RF encoder 114 articulates (e.g., is controlled to articulate) the RF antenna along the first direction (e.g., parallel with the feed direction 710) at a speed matched with the feed rate of the media process path 140 such that RF antenna 304 remains aligned with the RF tag 204A of the media element 200A as the media 136 is advanced along the media process path. Generally, when the RF tag 204A is aligned with the RF antenna 304, the RF tag 204A is within the predetermined programming range of the RF antenna 304. As the RF antenna 304 travels with the media 136, the RF tag 204A remains in the predetermined programming range. The RF antenna 304 may be articulated in the first direction 310 up to a length of the programming region (e.g., measured in the first direction 310, or along the media process path 140). Thus, the size of the programming region may be increased compared to a fixed position RF antenna to provide a greater articulation distance for the RF antenna 304 in the first direction, in turn providing additional programming time. Additionally, the feed rate of the media process path 140 may be slowed to provide more programming time.

In various examples, the feed rate along the media process path 140 is predetermined, or otherwise known. In some examples the feed rate is a constant feed rate. In some examples the feed rate is a predetermined sequence of different feed rates. In some examples the feed rate is a variable feed rate. Generally, the feed rate at any given time during the process is known, such that the RF encoder 114 may be controlled to accurately articulate the RF antenna 304 along with the RF tag 204.

In various examples, while the RF tag and the RF antenna are aligned, the RF antenna may emit an RF signal, which is received by an antenna of the RF tag 204A. The RF signal may contain data which is to be stored in a memory circuit of the RF tag 204A. In some examples, the RF signal may cause the RF tag 204 to emit a response signal, which is subsequently received by the RF antenna and decoded or read by the RF encoder 114.

Once the RF tag 204A has been within the predetermined programming range of the RF antenna 304 for the predetermined programming time, the RF encoder 114 may "reset" and return the RF antenna 304 to the front edge 309 of the programming region 308 in anticipation of a subsequent media element 200B (See FIG. 7C). In various examples, the RF encoder 114 reiterate the method 600 beginning with the steps of block 620 for each subsequent media element 200 included in the printing process.

In some examples, when the RF tags 204 of each media element are in the same relative position, when the RF encoder 114 resets the RF antenna 304, the RF antenna is articulated only in the first direction 310 not articulated in the second direction 312, as the RF antenna 304 is already aligned with the RF tag 204B of the subsequent media element 200B.

In various examples, RF tags 204 of subsequent media elements 200 have a predetermined distance therebetween. In such examples, the feed rate of the media process path 140 may be tuned to ensure that adequate time is provided to program each RF tag 204.

In the illustrated embodiment, the printhead 112 is illustrated and described as upstream (e.g., relative to the feed direction 710) of the RF encoder 114, where a given media element 200A is printed by the printhead 112 prior to the RF tag 204A of the given media element 200 is programmed by the RF encoder 114. Other orientations of the printhead 112 and the RF encoder 114 are contemplated. In some variations, the RF encoder 114 may be located upstream (e.g., relative to the feed direction 710) of the printhead 112, where a given media element 200A is printed by the printhead 112 after the RF tag 204A of the given media element 200 is programmed by the RF encoder 114. In other variations the programming region 308 of the RF encoder 114 may overlap in one direction or another with the printhead 112. In various examples, the RF tag 204A of the given media element 200 may be programmed by the RF encoder concurrently with being printed by the printhead 112.

In various examples, a first media element 200A may be printed while the RF tag 204B of a second media element 200B is being programmed by the RF encoder 114. Conversely, in some configurations, the second media element 200B may be printed while the RF tag 204A of the first media element is programmed by the RF encoder 114. In various examples, after printing has initiated on a first media element 200A, programming of the RF tag 204A of the first media element 200A may begin prior to the conclusion of printing on the first media element 200A, and programming of the RF tag 200A may conclude after printing has initiated on a second media element 200B, and so forth.

In various examples, different types of media elements 200 may have different dimensions, particularly along the feed direction. In some examples, media elements having a sufficiently large dimension in the feed direction may accommodate printing and programming of the same media element 200 simultaneously, depending on the particular configuration and alignment of the RF encoder 114 and the printhead 112 in the media processing device 100. In other examples, media elements 200 having a sufficiently small dimension along the feed direction may accommodate printing and programming separate media elements at a given time.

Figure 8:
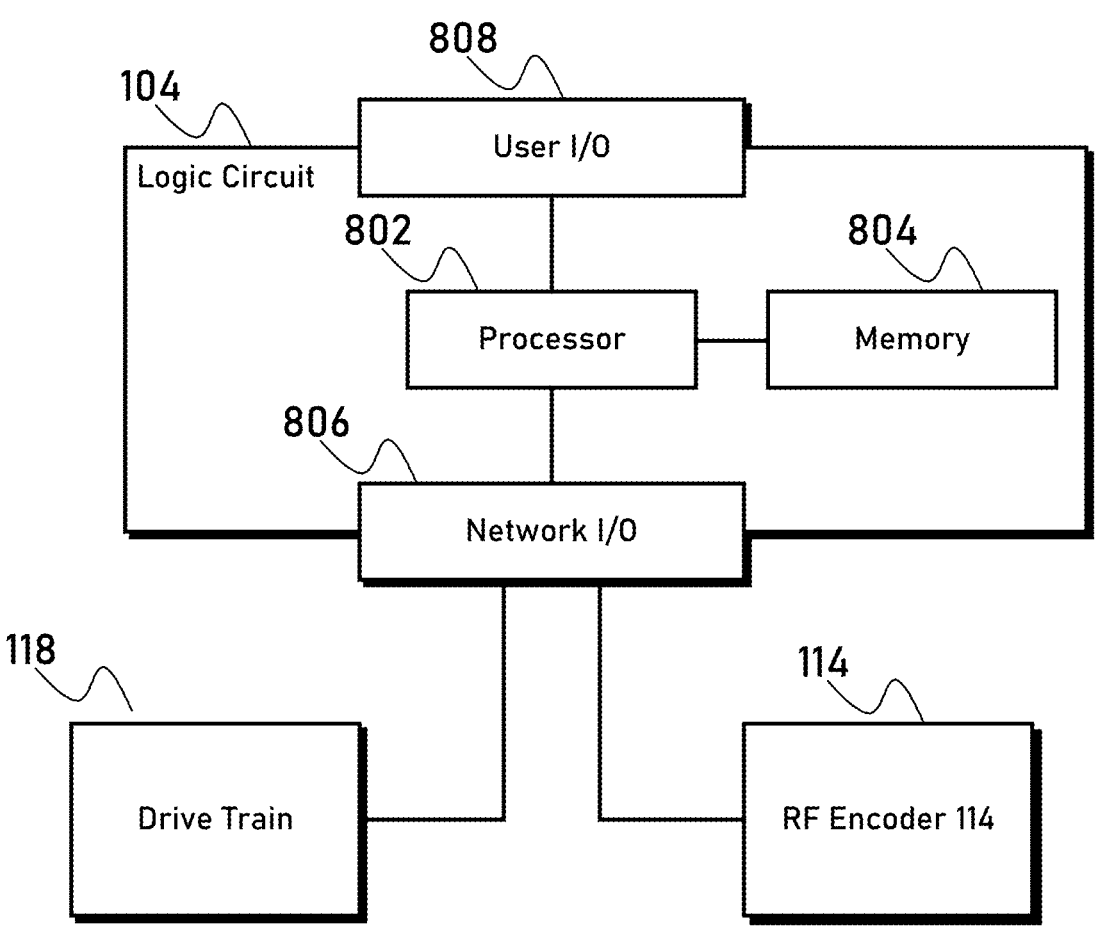
FIG. 8 illustrates a logic circuit, according to embodiments of the present disclosure.

FIG. 8 is a block diagram representative of an example logic circuit 104 capable of implementing, one or more steps of the method 600, and controlling one or more of the components of the media processing device 100 of FIG. 1. The example logic circuit 104 is a processing platform capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example logic circuit 104 includes a processor 802 such as, for example, one or more microprocessors, controllers, and/or any suitable type of processor. The example logic circuit 104 includes memory (e.g., volatile memory, non-volatile memory) 804 accessible by the processor 802

(e.g., via a memory controller). The example processor 802 interacts with the memory 804 to obtain, for example, machine-readable instructions stored in the memory 804 corresponding to, for example, the operations represented by the flowcharts of this disclosure. Additionally, or alternatively, machine-readable instructions corresponding to the example operations described herein may be stored on one or more removable media (e.g., a compact disc, a digital versatile disc, removable flash memory, etc.) that may be coupled to the logic circuit 104 to provide access to the machine-readable instructions stored thereon.

The example logic circuit also includes a network interface 806 to enable communication with other machines via, for example, one or more networks. The example network interface 806 includes any suitable type of communication interface(s) (e.g., wired and/or wireless interfaces) configured to operate in accordance with any suitable protocol(s).

The example, logic circuit 104 also includes input/output (I/O) interfaces 1108 to enable receipt of user input and communication of output data to the user.

In various examples, the logic circuit 104 is configured to perform calculations and output control signals to various components of the media processing device 100 to implement the method 600, as well as execute other portions of a printing and programming process. In various examples, the logic circuit 104 is configured to control a feed rate of media 136 through the media processing device 100 by controlling the drive train 118 of the media processing device 100. In various examples, the logic circuit 104 is configured to control the articulation of the RF antenna 304 by the RF encoder 114. In examples of the media processing device 100, where the media processing device 100 includes a sensor or sensing method to detect a position of an RF tag 204 of a media element 200, the logic circuit 104 may query the sensor, and/or receive a sensor output and subsequently process the sensor output to compute control signals to the drive train 118 and the RF encoder 114.

Generally speaking, in the context of the method 600, the logic circuit 104 is configured to control the drive train 118 (e.g., media driver) to drive the media 136 (e.g., media web) along the media process path, control the printhead 112 to impart the indicia on predetermined media elements 200; control the RF encoder 114 (e.g., antenna driver) to align the RF antenna 304 with the RF tag 204 of each media element 200 in the first direction 310; and control the articulatable RF encoder 114A, 114B, 114C to move the antenna in the second direction synchronously with the media driver such that the antenna remains aligned with the RF tag 204 of each media element 200 in the first direction 310 and in the second direction 312 when each media element 200 is in the programming region.

Figure 9:
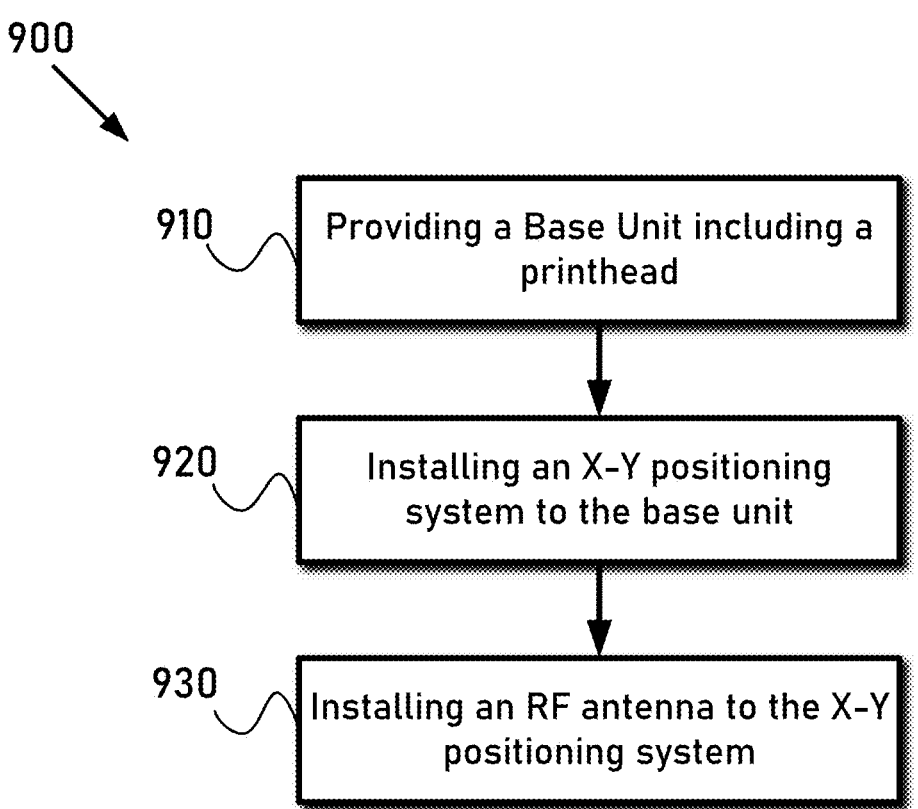
FIG. 9 illustrates a flowchart of a method for forming a media processing device, according to embodiments of the present disclosure.

FIG. 9 illustrates a flowchart of a method 900 of forming a media processing device (e.g., media processing device 100), according to embodiments of the present disclosure.

Block 910 of the method 900 describes providing a base unit including a printhead (e.g., printhead 112), according to embodiments of the present disclosure. In various examples, the base unit includes a housing, a logic circuit (e.g., logic circuit 104), a drive train (e.g., drive train 118), and other conventional components of a media processing device.

Block 920 of the method 900 describes installing an X-Y positioning system to the base unit, according to embodiments of the present disclosure. In various examples, the X-Y positioning system defines a programming area through which a carriage, or component of the X-Y positioning system is articulatable. In some examples, the X-Y positioning system includes a 2D driver and a platform over which the 2-D driver is articulatable. In some examples the X-Y positioning system includes a gantry assembly, which is configured to articulate a carriage along a crossbar and articulate the crossbar along a set of rails. In some examples the X-Y positing system includes a positioning stage which is articulatable in 2 dimensions.

In various examples, the X-Y positioning system may be installed in the base unit at a point of, or a point proximate to, a media process path (e.g., media process path 140). More specifically, the X-Y positioning system may be installed such that the plane in which the X-Y positioning system articulates is parallel to a plane of the media process path. In various examples, the X-Y positioning system is oriented and installed such that the plane in which the X-Y positioning system articulates is within a predetermined distance of the plane of the media process path (e.g., less than 10 cm, less than 5 cm, less than 3 cm).

In various examples, the X-Y positioning system may be electrically coupled to the logic circuit of the base unit, so as to receive control signals.

Block 930 of the method 900 describes coupling an RF antenna (e.g., RF antenna 304) to the X-Y positioning system, according to embodiments of the present disclosure. In some examples, the RF antenna may be coupled to the 2D driver of an X-Y positioning system. In some examples the RF antenna 304 may be coupled to a carriage of a gantry system when the X-Y positioning system includes a gantry system. In some examples the RF antenna may be coupled to an articulatable platform when the X-Y positioning system includes a positioning stage. In various examples, the RF antenna may be coupled to the X-Y positioning system prior to the X-Y positioning system being installed in the base unit. Generally, the RF antenna is coupled to the X-Y positioning system such that the RF antenna is articulatable throughout the programming region by the X-Y positioning system.

In various examples, the RF antenna may be electrically coupled to the logic circuit of the base unit, so as to receive control signals.

After both the X-Y positioning system and the RF antenna are installed to the base unit, the method 900 may be concluded. In some examples, the method 900 may be employed to produce a media processing device configured to execute the method 600.

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically config- ured hardware for performing operations (e.g., one or more of the operations described herein and represented by the flowcharts of this disclosure, if such are present). Some example logic circuits are hardware that executes machine- readable instructions to perform operations (e.g., one or more of the operations described herein and represented by the flowcharts of this disclosure, if such are present). Some example logic circuits include a combination of specifically configured hardware and hardware that executes machine- readable instructions. The above description refers to vari- ous operations described herein and flowcharts that may be appended hereto to illustrate the flow of those operations. Any such flowcharts are representative of example methods disclosed herein. In some examples, the methods repre- sented by the flowcharts implement the apparatus repre- sented by the block diagrams. Alternative implementations of example methods disclosed herein may include additional or alternative operations. Further, operations of alternative implementations of the methods disclosed herein may com- bined, divided, re-arranged or omitted. In some examples, the operations described herein are implemented by machine-readable instructions (e.g., software and/or firm- ware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine- readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is execut- ing), and/or a short period of time (e.g., while the machine- readable instructions are cached and/or during a buffering process)). Further, as used herein, each of the terms "tan- gible machine-readable medium," "non-transitory machine- readable medium" and "machine-readable storage device" is expressly defined to exclude propagating signals. That is, as used in any claim of this patent, none of the terms "tangible machine-readable medium," "non-transitory machine-read- able medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Addition- ally, the described embodiments/examples/implementations should not be interpreted as mutually exclusive and should instead be understood as potentially combinable if such combinations are permissive in any manner. In other words, any feature disclosed in any of the aforementioned embodi- ments/examples/implementations may be included in any of the other aforementioned embodiments/examples/imple- mentations.

The benefits, advantages, solutions to problems, and any element(s) that may cause any benefit, advantage, or solu- tion to occur or become more pronounced are not to be construed as a critical, required, or essential features or elements of any or all the claims. The claimed invention is defined solely by the appended claims including any amend- ments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not neces- sarily mechanically. A device or structure that is "config- ured" in a certain manner is configured in at least that manner but may also be configured in manners that are not listed.

The Abstract of the Disclosure is provided to allow the reader to quickly ascertain the nature of the technical dis- closure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A media processing device, configured to process a media web of media elements, each media element com- prising an RF tag, the media processing device comprising:

a media process path having a feed direction;

an RF encoder disposed at a point along the media process path, comprising:

a programming region;

an RF antenna configured to program RF tags; and a driver configured to articulate the RF antenna in a first direction perpendicular to the feed direction and within the programming region, and articulate the RF antenna in a second direction, parallel with the feed direction and within the programming region; and wherein the media processing device is configured to drive the media web along the media process path at a predetermined feed rate, wherein, during a printing process, the media processing device is configured to control the driver in the first direction to align the RF antenna with an RF tag of an individual media element of the media web entering the programming region on the media process path, and further configured to control the driver in the second direction such that the RF antenna remains aligned with the RF tag as the media web is driven along the media process path through the programming region.

2. The media processing device of claim 1, further comprising a printhead, the printhead configured to impart indicia onto the media elements.

3. The media processing device of claim 2, wherein during the printing process, the media processing device is configured to:

a) impart each media element of the media web with indicia, b) align each RF tag of the media web with the RF antenna for at least a predetermined amount of time, and c) advance the media web at the predetermined feed rate.

4. The media processing device of claim 2, wherein the printhead is a thermal printhead.

5. The media processing device of claim 2, wherein one of:

a) the RF encoder is located upstream of the printhead along the media process path, such that the RF tag of a given media element is programmed prior to the given media element being imparted with indicia during a printing process, and b) the printhead is located upstream of the RF encoder along the media process path, such that the RF tag of a given media element is programmed after the given media element is imparted with indicia during a printing process.

6. The media processing device of claim 2, wherein the printhead is located within the programming region, such that the RF tag of a given media element is programmed while being imparted with indicia during a printing process.

7. The media processing device of claim 1, wherein the RF encoder includes one or more of a two-dimensional driver, a dual axis motor, a dual axis stepper motor, a dual axis gantry system, a single plane positioning stage, and combinations thereof.

8. The media processing device of claim 1, wherein the predetermined feed rate is selected from a group consisting of a constant feed rate, a variable feed rate, and a sequence of feed rates.

9. A media processing device, comprising:

a media driver configured to drive a media web along a media process path in a feed direction;

a printhead disposed at a first point along the media process path and configured to impart indicia onto media elements of the media web;

an RF encoder disposed at a second point along the media process path and comprising:

a programming region aligned with a portion of the media process path;

an RF antenna configured to program an RF tag of each media element of the media web; and an antenna driver configured to articulate the RF antenna in a first direction perpendicular to the feed direction and within the programming region, and articulate the RF antenna in a second direction, parallel with the feed direction and within the programming region; and a logic circuit configured to:

control the media driver to drive the media web along the media process path;

control the printhead to impart the indicia on predetermined media elements;

control the antenna driver to align the RF antenna with the RF tag of each media element in the first direction; and control the antenna driver to move the RF antenna in the second direction synchronously with the media driver such that the RF antenna remains aligned with the RF tag of each media element in the first direction and in the second direction when each media element is in the programming region.

10. The media processing device of claim 9, wherein during a printing process, the media processing device is configured to impart indicia to a first media element via the printhead while concurrently programming the RF tag of the first media element via the RF antenna.

11. The media processing device of claim 9, wherein during a printing process, the media processing device is configured to impart indicia to a first media element via the printhead while concurrently programming the RF tag of the first media element or the RF tag of a second media element within the programming region via the RF antenna.

12. The media processing device of claim 9, wherein during a printing process, the media processing device is configured to process the media web along the media process path.

13. A method of forming a media processing device, comprising:

providing a base unit including a printhead, the base unit defining a media process path having a feed direction, installing an x-y positioning system at a point along the media process path, defining a two-dimensional programming region which is parallel with the media process path at the point along the media process path, and installing an RF antenna to the x-y positioning system, such that the RF antenna is articulatable by the x-y positioning system throughout the two-dimensional programming region.

14. The method of claim 13, wherein the point along the media process path is upstream of the printhead.

15. The method of claim 13, wherein the printhead is upstream of the point along the media process path.

16. The method of claim 14, wherein the printhead is located at the point along the media process path.

* * * * *